(12) United States Patent
Maar (10) Patent No.: US 6,655,883 B2
(45) Date of Patent: Dec. 2, 2003

(54) TOOL HOLDER

(75) Inventor: Peter Maar, Frickenhausen (DE)

(73) Assignee: Wohlhaupter GmbH, Frickenhausen (DE)

( * ) Notice: Subject to any disclaimer, the term of this patent is extended or adjusted under 35 U.S.C. 154(b) by 0 days.

(21) Appl. No.: 10/133,243

(22) Filed: Apr. 26, 2002

(65) Prior Publication Data

US 2003/0002938 A1 Jan. 2, 2003

Related U.S. Application Data

(63) Continuation of application No. PCT/EP00/09178, filed on Sep. 20, 2000.

(30) Foreign Application Priority Data

Oct. 27, 1999 (DE) .......................... 199 51 658

(51) Int. Cl.[7] .............................. B23B 29/034
(52) U.S. Cl. .................. 408/158; 82/1.2; 408/173
(58) Field of Search ............... 82/1.2, 1.4; 408/153, 408/158, 173, 178, 183, 163, 165, 172, 168

(56) References Cited

U.S. PATENT DOCUMENTS

| 2,223,041 A | * 11/1940 | Maxwell ................. 408/157 |
| 2,247,283 A | * 6/1941 | Young ..................... 82/1.2 |
| 2,350,778 A | * 6/1944 | Lang ...................... 82/1.2 |
| 2,358,516 A | 9/1944 | Knapp |
| 2,457,040 A | * 12/1948 | Hall ....................... 82/1.2 |
| 2,545,443 A | * 3/1951 | Bowren .................... 82/1.2 |
| 2,629,269 A | * 2/1953 | Nolde ..................... 82/1.2 |
| 2,848,912 A | * 8/1958 | Kalat ..................... 82/1.2 |
| 4,275,624 A | 6/1981 | Murray |
| 4,451,185 A | 5/1984 | Yamakage |
| 4,508,475 A | * 4/1985 | Peuterbaugh ............. 408/153 |
| 6,050,159 A | 4/2000 | Kress et al. |
| 6,312,200 B1 | * 11/2001 | Graham et al. .......... 408/1 R |

FOREIGN PATENT DOCUMENTS

| DE | 1 099 308 | 2/1961 |
| DE | 32 45 195 | 6/1984 |
| DE | 40 22 579 | 1/1991 |
| DE | 44 05 660 | 8/1995 |
| DE | 198 03 613 | 8/1999 |

* cited by examiner

*Primary Examiner*—Daniel W. Howell
(74) *Attorney, Agent, or Firm*—Barry R. Lipsitz; Douglas M. McAllister (57) ABSTRACT

The invention relates to a tool holder for use in machine tools, comprising a main body, which can rotate about an axis of rotation, and cutter holders which each hold a cutting plate and can be radially adjusted by means of an axially displaceable control rod and coupling means. In order to further develop said tool holder so that it is possible, within a very short time, to produce a turned groove which satisfies stringent demands regarding surface quality and geometric roundness, it is proposed, according to the invention, that the tool holder has at least two cutter holders which can be radially adjusted between a retracted position and an extended position and whose cutters can be simultaneously brought into engagement with the workpiece in order to produce a turned groove.

24 Claims, 5 Drawing Sheets

TOOL HOLDER

This application is a continuation of international application number PCT/EP00/09178 filed on Sep. 20, 2000.

The invention relates to a tool holder for use in machine tools, comprising a main body, which rotates about an axis of rotation, and cutter holders which each hold a cutting plate and can be radially adjusted by means of an axially displaceable control rod and coupling means.

Tool holders of this kind are used for turning work, in particular for producing an inner recess, hereinafter called a turned groove. In this connection, tool holders are known which have an axially displaceable control rod which can be driven in an axial movement by means of a machine-side hydraulic or electric servo drive. The axial movement is converted by suitable coupling means, for example via a wedge mechanism that can be actuated by the control rod, into a radial movement of a single cutter holder on which a cutting plate is disposed which comes into engagement with the workpiece to be machined. A tool holder of this kind is known from DE 40 22 579 A1, for example. The latter is for single-cutter machining.

Alternatively, tool holders are already known in which, for the purpose of producing a turned groove, a plurality of cutters are disposed about the circumference of a rotating mount which for its part revolves on a circular trajectory. In this kind of circular milling work, individual cutters successively engage the workpiece which is to be machined.

U.S. Pat. No. 4,275,624 discloses a tool holder in which two cutter holders are simultaneously provided which are disposed at an axial distance from one another and can be adjusted in the axial direction by means of an eccentrically mounted and axially displaceable control rod with an oblique toothing. A cutting tool can be fixed on each of the cutter holders, so that two turned grooves axially spaced apart from each other can be made simultaneously in a workpiece. For each turned groove, only one cutting tool comes into engagement with the workpiece.

Tool holders for single-cutter machining and tool holders with a plurality of cutters for circular machining have the disadvantage that the surface quality obtained with them in the turned groove, and the geometric roundness of the latter, is in many cases unsatisfactory, with the result that re-machining may be necessary. In addition, the turned groove requires a considerable production time.

It is an object of the present invention to form a tool holder of the type mentioned at the outset in such a way that it is possible, within a very short time, to produce a turned groove which satisfies stringent demands regarding surface quality and geometric roundness.

According to the invention, this object is achieved, in a tool holder of the generic type, by the fact that the tool holder has at least two cutter holders which can be radially adjusted between a retracted position and an extended position and whose cutters can be simultaneously brought into engagement with a workpiece in order to produce a turned groove. Using a plurality of cutter holders whose cutters simultaneously engage with the workpiece during machining provides for mutual supporting of the cutters. This results in a higher degree of precision and, consequently, a particularly high surface quality of the turned groove which is produced. Moreover, it is thereby possible to meet very stringent demands in respect of the geometric roundness of the turned groove. In addition, the simultaneous use of a plurality of cutters permits a considerable reduction in the time needed to produce the turned groove. This provides considerable cost advantages for the user, which in turn leads to savings on production units and represents a significant potential for rationalization.

The tool holder preferably comprises three cutter holders disposed about a circumference of a circle and each with an associated cutter. The use of three cutters effects particularly reliable mutual support, and by this means the radial feed can also be increased by a factor of 3 compared to machining of the workpiece with only one cutter, as a result of which, once again, the time needed to produce the turned groove can be correspondingly reduced. In this connection, provision can be made for the tool holders to be disposed uniformly about the circumference. A non-uniform distribution can be particularly advantageous since the non-uniform introduction of force which can thereby be obtained results in strong damping of vibrations.

The radial movement of the cutter holders is produced by the control rod, the movement of which is transmitted to the cutter holders via suitable coupling means. A hydraulic or electric servo drive can be used on the machine side for driving the control rod. However, it is particularly advantageous if the drive of the control rod is effected mechanically. For this purpose, provision can be made for the tool holder to comprise gear means for converting a rotation movement of the main body into an axially oriented reciprocating movement of the control rod. In such an embodiment, the main body has a dual function. On the one hand, the rotation movement guarantees a corresponding rotary movement of the cutters, and, on the other hand, the rotation movement of the main body serves as a drive for the control rod, which in turn produces the radial movement of the cutter holders. Such a configuration has the advantage that on the machine side only a drive spindle has to be provided to which the main body can be coupled in order to obtain a rotation movement, and so a hydraulic or electric servo drive on the machine side can be dispensed with. In this case, the tool holder has a purely mechanical drive system and can therefore be of particularly robust construction.

In order to be able to easily adapt the working stroke of the cutter holders, between their retracted position and their extended position, to the specific conditions of use, it is advantageous if the axial stroke of the control rod is adjustable. For this purpose, depending on the axial stroke which is desired, different gear means can be used for converting the rotation movement of the main body into the axial movement of the control rod.

In a preferred embodiment, the gear means comprise two cam elements which can rotate relative to one another and bear on one another via a control cam which is oriented obliquely with respect to the axial direction. The cam elements can be of annular construction, for example, and can enclose the main body about its circumference, it being ensured that they have a different speed of rotation relative to one another. At least one cam element forms a control cam on which the other cam element bears, and, as a result of the oblique orientation of the control cam, an axial movement is produced by the relative turning of the cam elements which bear on one another.

In this connection, it is advantageous if a first cam element is coupled to the main body via a toothed gearing. In this way, the rotation movement of the main body is transmitted to the first cam element via the toothed gearing.

The toothed gearing can be constructed in the manner of a planetary gear, for example, and can have two planetary wheels disposed on a common axis of rotation, connected rigidly to one another and each meshing with a toothed ring, the toothed rings preferably being oriented coaxially with respect to the axis of rotation of the main body and each surrounding said main body. In this connection, a first toothed ring can be mounted nonrotatably on the main body and thus executes a common rotation movement with the latter, while the second toothed ring has a different speed of rotation in relation to the main body. The first cam element is preferably mounted directly and in a rotationally fixed manner on the second toothed ring. By selecting the desired transmission ratios, on the one hand between the toothed rings and the planetary wheels, and, on the other hand, between the two planetary wheels, the speed of rotation of the second toothed ring and of the first cam element can thus be adjusted.

A rotation movement of the second cam element can be obtained by the fact that it is connected rigidly to the control rod, which control rod is mounted on the main body in such a way as to be axially displaceable but not rotatable. Because of the nonrotatable mount, the control rod has the same speed of rotation as the main body, with the result that the second cam element connected rigidly to the control rod also has the identical speed of rotation.

The reciprocating movement of the control rod is produced by means of the control cam. In this connection, it is of advantage if the return movement of the control rod is spring-assisted. Thus, for example, provision can be made for one of the two cam elements, for example the second cam element, to be spring-loaded in the direction of the other cam element. By this means it is possible to ensure that the two cam elements bear securely on one another even at very high speeds of rotation. The spring-loading can be produced, for example, by means of a compression spring, which bears on the control rod, and is transmitted from this to the second cam element connected to it.

The coupling means disposed between the control rod and the cutting plates have not yet been explained. In a preferred embodiment of the tool holder according to the invention, the cutter holders are mounted displaceably in radially oriented guides and each bear on a slide surface, of the control rod, oriented obliquely with respect to the axis of rotation. It is thus ensured, in a particularly simple way in terms of construction, that the cutter holders are displaced radially from their retracted position to their extended position when the control rod is moved axially forward.

In order to ensure a forced return of the cutter holders from their extended position to their retracted position upon a reverse axial movement of the control rod, an elastic return element is preferably provided. A particularly preferred embodiment in this connection is characterized in that the cutter holders comprise a carriage which is displaceable between the retracted position and the extended position and on which the cutter is mounted, and a return spring loading the carriage in the direction of its retracted position.

In order to ensure that the cutter holders do not execute any uncontrolled, radially outwardly directed movement as a result of the centrifugal forces induced by rotation, the cutter holders, in a particularly preferred embodiment, are mounted displaceably on the control rod and can be positively connected thereto. The positive connection ensures that the cutter holders bear securely on the control rod even at high speeds of rotation. An uncontrolled movement is avoided.

The positive connection can be configured, for example, as a dovetail guide. In a structurally particularly simple embodiment of the positive connection between cutter holder and control rod, a guide slot is provided on one of the parts to be connected, and a tension bolt of complementary configuration fixed on the other part engages in the guide slot.

It is advantageous if the tool holder comprises an adjustment mechanism for adjusting the setting of the cutter holders in their retracted position. In this way, the cutters mounted on the cutter holders and used for producing a turned groove can easily be adapted to the particular internal diameter of the workpiece bore which is to be provided with the turned groove.

In order to adjust or fine-tune the setting of the cutter holders, provision is preferably made for the length of the control rod to be able to be altered. The longer the control rod, the more the cutter holders bearing obliquely on it protrude radially outward. If the setting of the cutter holders is to be adapted, for example, to a smaller diameter of the workpiece bore, all that has to be done is to reduce the length of the control rod.

For this purpose, it is advantageous if the control rod has separate front and rear rod portions which can be connected to one another with adjustable axial spacing via an adjustment element.

The tool holder according to the invention comprises a plurality of cutter holders which each have a cutter and which, via mechanical transmission means, are driven in a radially oriented movement by the rotating main body, executing a radial movement from their retracted position to their extended position and back again to the retracted position. All the cutters come simultaneously into engagement with the workpiece and in so doing mutually support each other. To obtain a turned groove, all that has to be done is to drive the main body in a rotation movement so that the cutter holders extend outward for radial grooving and then resume their retracted position.

In a particularly preferred embodiment, the tool holder comprises a sensor unit for detecting the retracted position of the cutter holders. By means of the sensor unit it is possible to generate a stop signal for the machine-side drive of the main body, so that the machine-side drive of the main body can be switched off when the cutter holders have resumed their retracted position.

It is particularly advantageous if the retracted position and also the extended position of the cutter holders can be detected by means of the sensor unit. This permits particularly reliable monitoring of the grooving procedure.

The retracted position and advantageously also the extended position can preferably be detected in a contactless manner. In this way, mechanical wear of the sensor unit can be avoided.

In a preferred embodiment, the sensor unit has at least one Hall sensor, with which at least one corresponding magnet is associated. The retracted position of the cutter holders can thus be determined, for example, by means of a magnet being disposed on each of the cutter holders and having in each case a corresponding Hall sensor. Provision can also be made for contactless detection of the position of the control rod which corresponds to the position of the cutter holders since, because of the positive guidance of the cutter holders, there is an unambiguous relationship between the position of the control rod and the position of the cutter holders. Thus, for example, a plurality of magnets can be disposed on the second cam element connected rigidly to the control rod, the axial movement of the second cam element corresponding to the corresponding axial movement of the control rod.

It is advantageous if the tool holder has an electric voltage supply for the sensor unit, for example the Hall sensor, as it is thereby possible to dispense with an external electrical supply line.

The sensor signal made available by the sensor unit is evaluated and processed in a conventional manner by means of an electronics unit. The latter is preferably located adjacent to the sensor unit.

In an advantageous embodiment, the electronics unit can switch on and off automatically as a function of the rotation movement of the main body. It is thus possible to ensure that the electronics unit is switched on only when the main body is rotating and detection of the setting of the cutter holders is thus desired. Otherwise, the electronics unit is switched off, with the result that its power consumption is kept very low.

To allow the sensor electronics to switch on and off automatically, the tool holder can comprise, for example, a reed switch and an associated magnet.

The sensor unit is preferably associated with an electrical data transmission unit for wireless transmission of the determined position data to a machine-side control. In this case, the transmission can be, for example, by radio signal or infrared signal.

It is advantageous if the tool holder comprises a tool head which can be connected releasably to the main body and on which the cutter holders are disposed, and a stationary housing enclosing the main body. This makes it possible, in a particularly simple and time-saving manner, to exchange the desired cutter holders with fixed cutter while the entire tool head is detached from the main body.

The stationary housing preferably accommodates the sensor unit together with associated electronics and voltage supply, and the reed switch too can be mounted on the housing.

The following description of a preferred embodiment of the invention provides a more detailed explanation and is given with reference to the drawing, in which.

Figure 4:
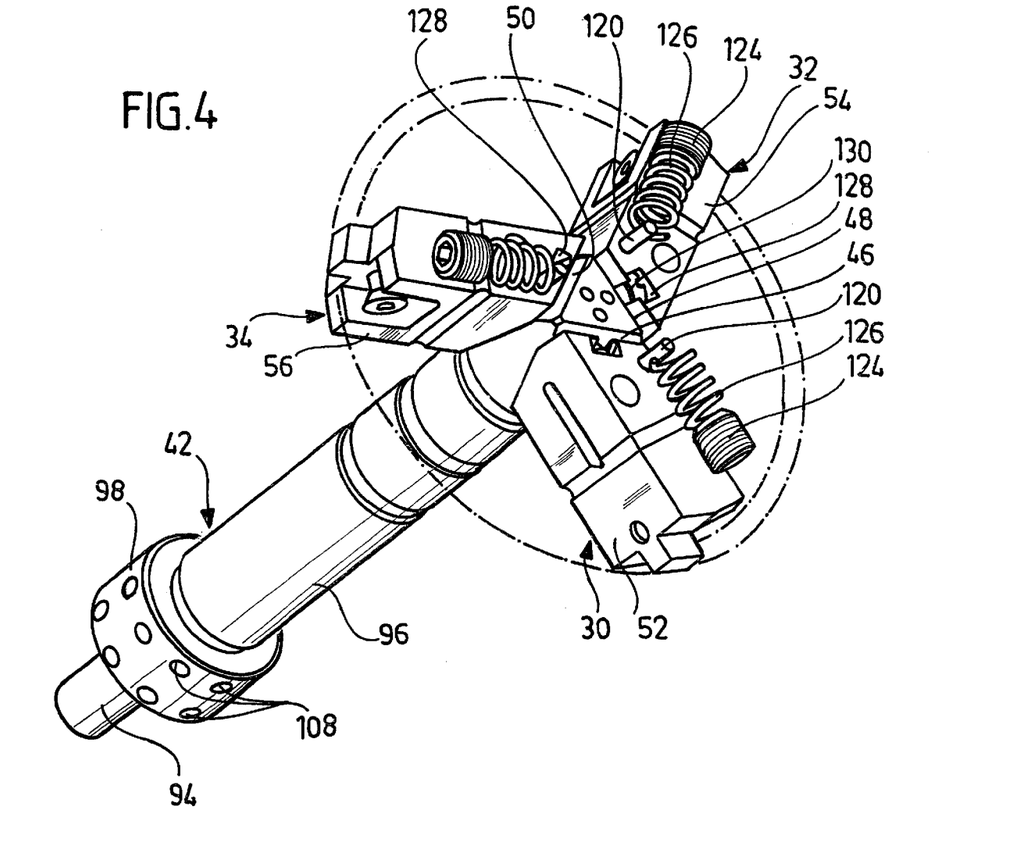
FIG. 4 shows a perspective partial view of a tool head of the tool holder.
Figure 5:
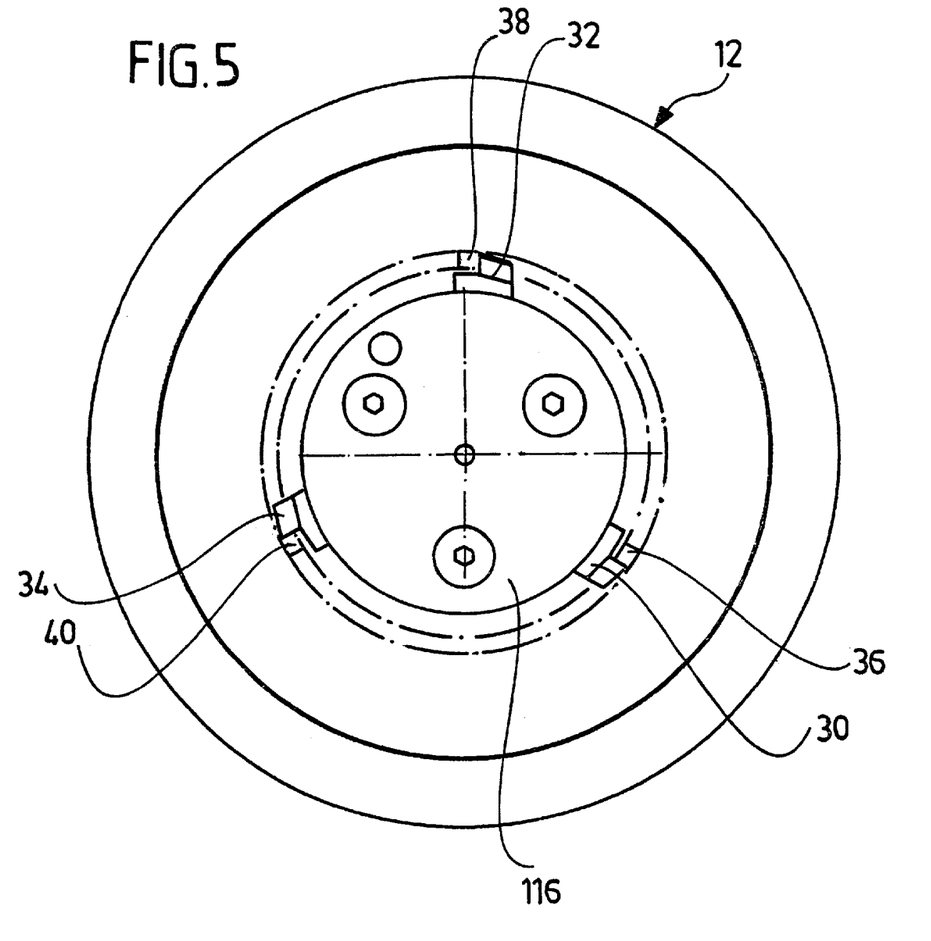
FIG. 5 shows a front view of the tool holder in the direction of the arrow A in FIG. 1.

The drawing shows a tool holder designated generally by reference number 10. This tool holder is intended for use on a machine tool and for this purpose can be coupled in a conventional manner to the machine spindle of the machine tool. The tool holder 10 comprises a housing 12 which is mounted in a stationary manner on the machine tool by means of a torque support which is known per se and is therefore not shown in the drawing, which housing 12 surrounds a main body 18 which is disposed rotatably on the housing 12 by means of ball bearings 14, 16 and is driven in rotation by the machine tool. The main body 18 is rotatable about an axis of rotation 20 and is of substantially cylindrical configuration. For coupling to the machine spindle, the main body 18 has a central recess 24 on its rear end 22 directed toward the machine tool. A conventional steep-taper shank could alternatively be provided for coupling purposes. On its front end 26 directed away from the recess 24, the main body 18 carries a tool head 28 which can be connected releasably to the main body 18 and on which, as can be gathered in particular from FIG. 4, three cutter holders 30, 32, 34 are mounted in a radially displaceable manner, which cutter holders 30, 32, 34 are disposed uniformly about a circumference and on each of which a cutter 36, 38, 40, respectively, is fixed.

The cutter holders 30, 32, 34 are actuated via a control rod 42 which engages in a longitudinal bore 58 of the main body 18, which longitudinal bore 58 opens into the front face 26 and is oriented coaxially with respect to the axis of rotation 20, and, at its free end projecting beyond the front face 26, the control rod 42 has slide surfaces 46, 48, 50 which are each oriented obliquely at an angle of 120° in relation to the axis of rotation 20 and on each of which there is fixed a cutter holder 30, 32, 34, respectively, with a carriage 52, 54, 56, respectively.

An oblong hole 60 oriented transversely with respect to the axis of rotation 20 and passing through the main body 18 and the longitudinal bore 58 forms a guide for a bolt 62 which passes through the oblong hole 60 and the control rod 42 and which protrudes at both ends from the oblong hole 60 and ensures that the control rod 42 is mounted in the main body 18 in such a way that it is fixed in terms of rotation, but displaceable axially, i.e. coaxial to the axis of rotation 20.

The axial movement of the control rod 42 is, like its rotation movement, produced by the movement of the main body 18. To obtain the axial movement, the control rod 42 is coupled to the bolt 62 via a control cam 64 and a planetary gearing 66 is coupled to the main body 18. The planetary gearing 66 comprises two toothed rings 70, 72 which are oriented coaxially with respect to the axis of rotation 20 and bear on a radially outwardly directed flange 68 of the main body 18, and two planetary wheels 78, 80 which are connected rigidly to one another, are mounted on a common axis 74 in a seat 76 of the housing 12 and each mesh with a toothed ring 70, 72, respectively. The rotary movement of the first toothed ring 70, connected in a rotationally fixed manner to the main body 18, is transmitted via the two planetary wheels 78, 80 to the rotatably mounted second toothed ring 72. The transmission ratios of the planetary gearing 66 are in this case chosen such that the second toothed ring 72 has a slightly higher speed of rotation than the first toothed ring 70 and the main body 18.

A feed ring 82 which surrounds the main body 18 and can rotate relative to the latter is connected in a rotationally fixed manner to the second toothed ring 72. Adjoining this feed ring 82 in the axial direction there is a second feed ring 84 which likewise surrounds the main body 18 circumferentially and has a radial through-bore 86 into which the bolt 62 engages. The second feed ring 84 is connected to the control rod 42 in a rotationally fixed manner via the bolt 62.

Figure 1:
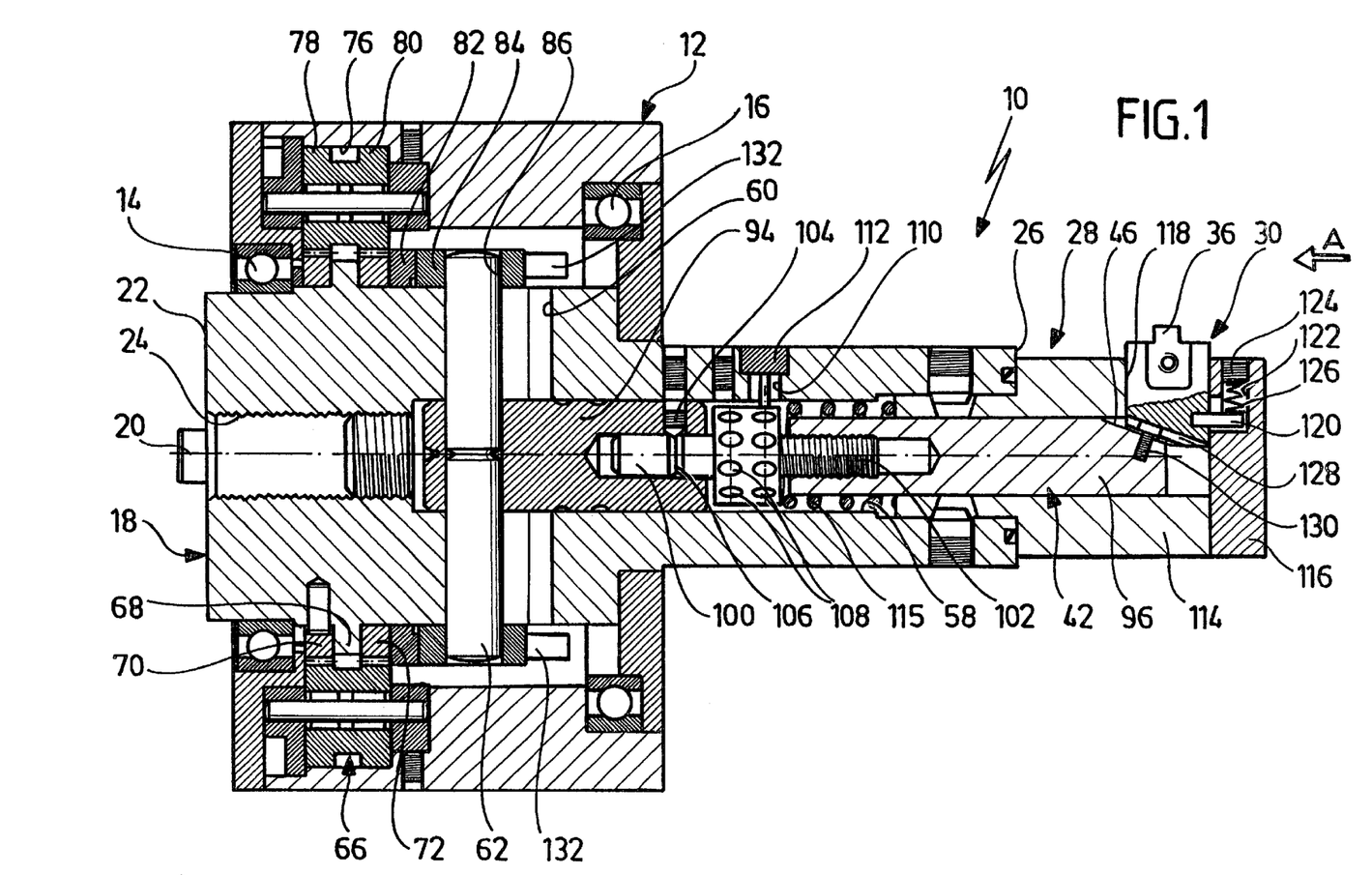
FIG. 1 shows a schematic longitudinal section through a tool holder.
Figure 2:
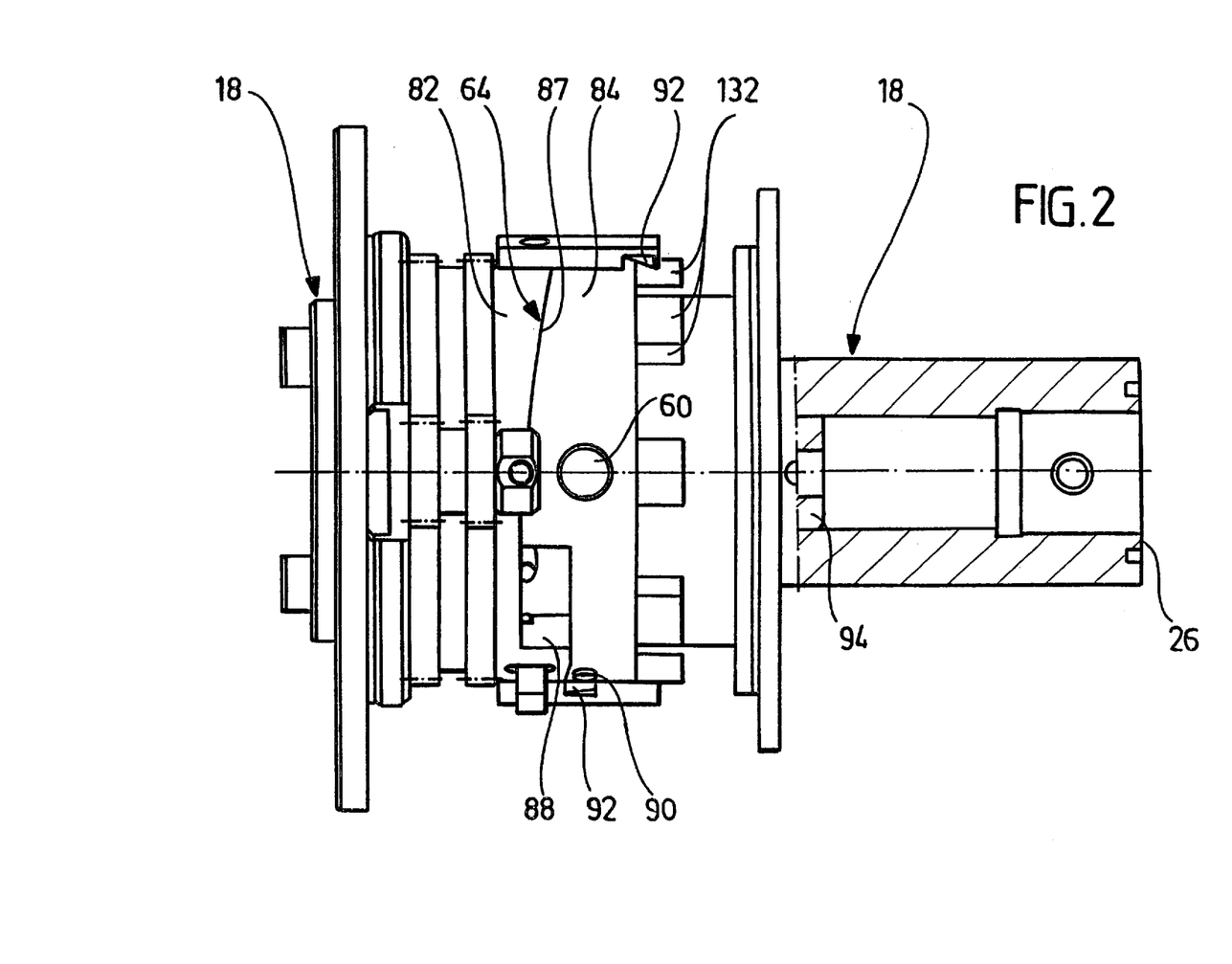
FIG. 2 shows a partially cutaway side view of a main body of the tool holder with the housing removed.
Figure 3:
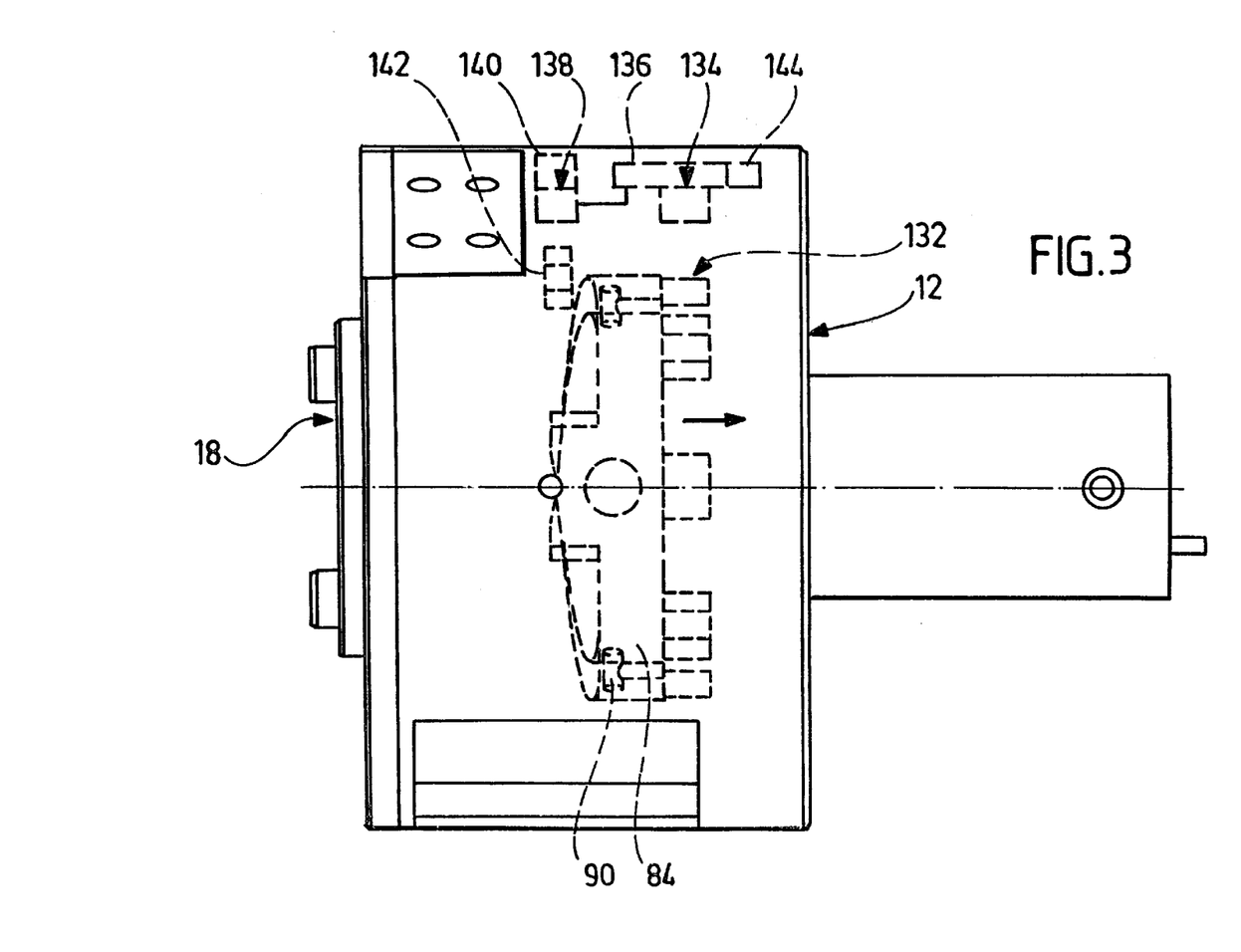
FIG. 3 shows a side view of the main body with housing.

In their mutual contact region, the two feed rings 82, 84 form the control cam 64 which, as can be gathered in particular from FIG. 2, has a helical line portion 87 which is adjoined circumferentially by a rebound 88. It is thus oriented obliquely with respect to the axis of rotation 20. As a result of the chosen transmission, the first feed ring 82 connected in a rotationally fixed manner to the second toothed ring 72 has a slightly higher speed of rotation than the second feed ring 84 which is connected to the main body 18 in a rotationally fixed manner via the bolt 62. Because of the oblique orientation of the control cam 64, the relative movement thereby obtained between the two feed rings 82, 84 results in an axial movement of the second feed ring 84 and of the control rod 42 coupled to the latter via the bolt 62. The rebound 88 oriented parallel to the axis of rotation 20 ensures that, after an initial axial movement in the direction of the front end 26, the second feed ring 84, and with it the control rod 42, is returned abruptly to its original position. The result of this is that the control rod 42 executes an axially oriented reciprocating movement when the main body 18 is being driven in a rotary movement. In order to ensure that the second feed ring 64 is displaced in the direction of the rear end 22 upon reaching the rebound 88, the feed ring 84 carries, on its outside, two radially directed carrier pins, of which only one carrier pin 90 is visible in the drawing. These carrier pins 90 each engage in a guide seat 92 disposed in a rotationally fixed manner on the first feed ring 82 and circumferentially adjacent to the rebound 88, by which means it is ensured that the second feed ring 84, rotating relative to the first feed ring 82, abruptly resumes its original position when it reaches the rebound 88.

The control rod 42 is constructed in three parts and comprises a rear rod portion 94 through which the bolt 62 engages, a front rod portion 96 which protrudes beyond the front face 26 of the main body 18, and a middle portion 98 connecting the two rod portions 94, 96 to one another. The middle portion 98 forms an adjustment mechanism by means of which the length of the control rod 42 can be adjusted. For this purpose, the middle portion 98 is of cylindrical configuration and is mounted rotatably in the longitudinal bore 58 of the main body 18. On both of its end faces, the middle portion 98 in each case carries a guide bolt 100, 102, the rear guide bolt 100 engaging in a corresponding blind bore of the rear rod portion 94 and being connected to the rear rod portion 94 so as to be rotatable, but not axially displaceable, by way of a threaded pin 104 and a corresponding circumferential groove 106. By contrast, the front guide bolt 102, engaging in a corresponding blind bore of the front rod portion 96, has an external thread which corresponds with a corresponding internal thread of the front rod portion 96. If the middle portion 98, and with it the front guide bolt 102, is rotated relative to the front rod portion 96, the front rod portion 96 is thereby screwed to a greater or lesser extent onto the guide bolt 102. The result of this is that the overall length of the control rod 42 can be altered by rotation of the middle portion 98. To be able to effect the rotation, the middle portion 98 has a multiplicity of through-bores 108 oriented transversely with respect to the axis of rotation 20, and, level with the through-bores 108, the main body 18 is provided with an opening 110 so that, after removal of a cover 112 closing off the opening 110, the through-bores 108 can be accessed and the middle portion 98 can be rotated, via the opening 110, with the aid of a suitable tool engaging in one of the through-bores 108.

The tool head 28 has a sleeve 114 surrounding the front end region of the control rod 42. In the view of the tool head 28 shown in FIG. 4, this sleeve 114 has been omitted for reasons of improved clarity. At its free end, the sleeve 114 is closed off by a cover 116 which, again for reasons of clarity, has been omitted in FIG. 4. Clamped between the sleeve 114 and the middle portion 98 of the control rod 42 there is a compression spring 115 which acts on the control rod 42 with a spring force in the direction of its rearward position. This results in a force acting on the second feed ring 84.

The sleeve 114 has three radially oriented guide apertures 118 which are disposed uniformly in the circumferential direction and at the same axial level, and in which the carriages 52, 54 and 56 are respectively mounted in such a way that they are nonrotatable but radially displaceable. On their front aspect directed away from the front face 26, the carriages 52, 54, 56 each carry a retaining pin 120 which engages in a blind bore 122 formed in the cover 116 parallel to the guide apertures. The blind bores 122 are each closed off by a threaded pin 124. The threaded pins 124 are each connected to one end of a helical return spring 126, the other end of which is in each case fixed to a retaining pin 120.

On their engagement surface directed toward the respective slide surface 46, 48, 50 of the control rod 42, the carriages 52, 54 and 56 have a T-shaped guide slot 128 into which there engages a tension bolt 130, screwed into the control rod 42 perpendicular to the respective slide surface 46, 48, 50, and with a bolt head having a configuration matching the guide slot 128.

If the main body 18 is being driven in rotation by the machine spindle, then this results in a corresponding rotation movement of the tool head 28. At the same time, as has already been explained, an axial movement of the control rod 42 is produced via the planetary gearing 66 and the control cam 64, so that this control rod 42 moves in a defined manner in the direction of the cover 116 and in so doing displaces the carriages 52, 54, 56, and the cutters 36, 38, 40 disposed thereon, radially outward. The displacement of the carriages 52, 54, 56 here takes place counter to the force of the return spring 126. In addition, the positive connection formed by the tension bolt 130 and the guide slot 128 ensures that the carriages 52, 54, 56, despite the considerable centrifugal forces acting on them, execute a defined radial movement and all three cutters 36, 38, 40 can simultaneously come into engagement with the workpiece to be machined in order to produce a turned groove. Once the carriages 52, 54, 56 have reached a desired extended position, the rebound 88 formed on the feed rings 82, 84 results in a reverse movement of the control rod 42, so that the carriages 52, 54, 56 again assume their original retracted position.

In order to be able to detect the position of the cutter holders 30, 32, 34 with the carriages 52, 54, 56 in a contactless manner and to be able to transmit this position to a machine-side control, the second feed ring 84 carries, on its face directed away from the first feed ring 82, a plurality of permanent magnets 132 which are disposed about its circumference and are associated with a Hall element 134 which is located in a corresponding seat of the housing 12 and with which the position of the second feed ring 84 can be detected. As this feed ring 84 is coupled rigidly via the bolt 62 to the control rod 42 and the latter is coupled to the carriages of the cutter holders 30, 32, 34, the position of the cutter holders 30, 32, 34 can thus be detected via the magnets 132 and the Hall element 134.

The Hall element 134 is electrically connected to an electronics unit 136 which is likewise positioned in the housing 12 and to which a voltage supply 140, arranged in the housing 12, is connected via a reed switch 138. The reed switch 138 is associated with a magnet 142 which is disposed on the second feed ring 84 and with which the reed switch 138 can be actuated. By means of the reed switch 138, the electronics unit 136 is actuated only in the event of a rotation movement of the main body 18. Otherwise, the electronics unit 136 is in a current-saving mode in order to lower the power consumption of the electronics unit 136 and to switch off the power supply to the Hall element 134 and to a data transmission unit 144.

The electronics unit 136 comprises the data transmission unit 144 with which the position data detected by the Hall element 136 can be transmitted to the machine-side control. In this way it is possible in particular to generate a stop signal for the machine spindle, so that the rotary movement of the main body 18 can be interrupted by the machine-tool control as soon as the cutter holders 30, 32, 34, having passed through their extended position, have once again reached their retracted position. The tool holder can then be easily withdrawn from the machined workpiece by means of the machine spindle, without the cutters 36, 38, 40 colliding with the workpiece.

What is claimed is:

1. A tool holder for use in machine tools, comprising:
a main body, which rotates about an axis of rotation, at least two cutter holders which each hold a cutting plate and can be radially adjusted by means of an axially displaceable control rod and coupling means between a retracted position and an extended position, and gear means for converting a rotation movement of the main body into an axially oriented reciprocating movement of the control rod, wherein the at least two cutter holders are disposed about a common circumference of a circle and their cutters can be simultaneously brought into engagement with a workpiece in order to produce a turned groove.

2. The tool holder as claimed in claim 1, wherein the tool holder comprises three cutter holders disposed about a circumference of a circle.

3. The tool holder as claimed in claim 1, wherein the tool holder comprises a tool head which can be connected releasably to the main body and on which the cutter holders are disposed, and a stationary housing enclosing the main body.

4. The tool holder as claimed in claim 1, further comprising means for adjusting an axial stroke of the control rod.

5. The tool holder as claimed in claim 1, wherein the gear means comprise two cam elements which can rotate relative to one another and bear on one another via a control cam which is oriented obliquely with respect to the axial direction.

6. The tool holder as claimed in claim 5, wherein a first cam element is coupled to the main body via a toothed gearing.

7. The tool holder as claimed in claim 5, wherein the second cam element is connected rigidly to the control rod, said control rod being mounted on the main body in such a way as to be axially displaceable but not rotatable.

8. The tool holder as claimed in claim 5, wherein one of the two cam elements is spring-loaded in the direction of the other cam element.

9. The tool holder as claimed in claim 1, wherein the cutter holders are mounted displaceably in radially oriented guides and each bear on a slide surface, of the control rod, oriented obliquely with respect to the axis of rotation.

10. The tool holder as claimed in claim 1, wherein the cutter holders comprise a return element for forced return of the cutter holders from their extended position to their retracted position.

11. The tool holder as claimed in claim 10, wherein:

the cutter holders comprise a carriage which is displaceable between the retracted position and the extended position and on which the cutter is mounted, and the return element comprises a return spring for loading the carriage in the direction of its retracted position.

12. The tool holder as claimed in claim 1, wherein the cutter holders are mounted displaceably and with positive connection in the control rod.

13. The tool holder as claimed in claim 12, wherein, for the positive connection, a guide slot is in each case provided into which there engages a tension bolt of complementary configuration.

14. The tool holder as claimed in claim 1, wherein the tool holder comprises an adjustment mechanism for adjusting the setting of the cutter holders in their retracted position.

15. The tool holder as claimed in claim 1, further comprising means for altering the length of the control rod.

16. The tool holder as claimed in claim 15, wherein the control rod has a front rod portion and a rear rod portion which can be connected to one another with adjustable axial spacing via an adjustment element.

17. The tool holder as claimed in claim 1, wherein the tool holder comprises a sensor unit for detecting the retracted position of the cutter holders.

18. The tool holder as claimed in claim 17, further comprising means for detecting the retracted position in a contactless manner.

19. The tool holder as claimed in claim 17, wherein the sensor unit has a Hall element and at least one corresponding magnet.

20. The tool holder as claimed in claim 17, wherein the tool holder has an electric voltage supply for the sensor unit.

21. The tool holder as claimed in claim 20, wherein the sensor unit is associated with an electronics unit which can switch on and off automatically as a function of the rotation movement of the main body.

22. The tool holder as claimed in claim 21, wherein the tool holder comprises a reed switch and an associated magnet.

23. The tool holder as claimed in claim 17, wherein the sensor unit is associated with a data transmission unit for wireless transmission of the determined position data to a machine-tool control.

24. The tool holder as claimed in claim 3, wherein the housing accommodates a sensor unit, an electronics unit and an electric voltage supply.

* * * * *